UNITED STATES PATENT OFFICE.

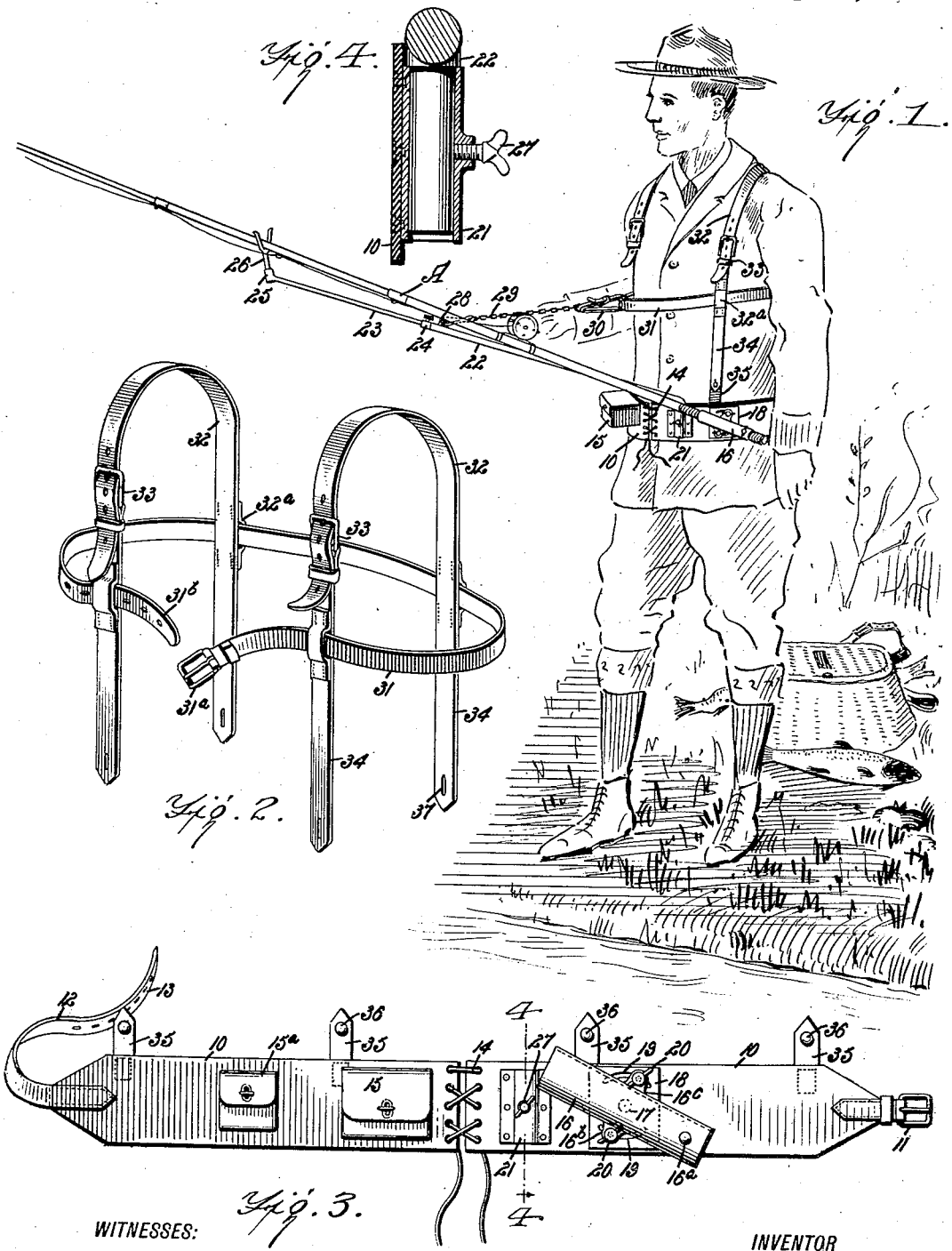

KENTON DRINKARD, OF BEAUMONT, TEXAS.

FISHING DEVICE.

1,198,202.  Specification of Letters Patent.  Patented Sept. 12, 1916.

Application filed April 14, 1916. Serial No. 91,064.

*To all whom it may concern:*

Be it known that I, KENTON DRINKARD, a citizen of the United States, and a resident of Beaumont, in the county of Jefferson and State of Texas, have invented a new and Improved Fishing Device, of which the following is a full, clear, and exact description.

My invention relates to a means to support a fishing pole on the person of a fisherman so that the pole may be temporarily held in fishing position with the hands free.

Objects of the invention are to provide pole-supporting means of the indicated class that may be conveniently strapped on the body of the wearer; to provide a supporting means capable of swinging movement laterally; and to provide a support that may be detachably engaged with the body belt and straps in a manner to facilitate the attachment of the support and its ready adjustment for use.

The invention will be particularly explained in the specific description following.

Reference is to be had to the accompanying drawings forming a part of this specification in which similar reference characters indicate corresponding parts in all the views.

Figure 1 is a perspective view of a fishing rod support embodying my invention, showing the same in use; Fig. 2 is a perspective view of the shoulder straps; Fig. 3 is a front view of the belt; Fig. 4 is a transverse vertical section on the line 4—4, Fig. 3.

In carrying out my invention, a belt 10 is provided of suitable flexible material, such as leather, canvas, or the like, and provided at one end with a buckle 11 and at the other end with a strap 12 having a series of holes 13 for engaging the buckle tongue. The belt is preferably formed in two sections laced together at the front as at 14. Also, at the front of the belt is provided receptacles 15, 15ª, for carrying lunch, tackle, etc.

On the belt 10 is secured a pole socket 16, which is swiveled at the center as at 17 to a plate 18, suitably fastened to the said belt. The socket 16 has a clamp screw 16ª to fasten the pole in the socket when desired and suitable means are provided to hold the socket in different angular positions on the plate 18; as one means for the purpose I have shown curved slots 19 receiving wing screws 16ᵇ that pass also, through ears 16ᶜ on said socket. Thus, a fishing pole A may be placed in the socket 16 and made fast therein, and the socket then adjusted at the proper angle.

To brace the pole A, an elongated bracket arm 22 has a downwardly extending end adapted to be received in a socket 21 on the belt 10. Said bracket 22 has a front extension member 23 telescoping therein, adapted to be made fast by a set screw 24. At the outer end the member 23 of the bracket has a socket 25 receiving the shank of a fork 26 constituting a pole rest. The socket 21 has a set screw 27, preferably a wing screw, for fastening the bracket 22 in position.

To steady the bracket 22 on the supported pole, a chain 29 is connected at its outer end to an eye 28 on the said bracket and at its inner end, said chain is connected with a billet 30 slidable on a body strap 31. The body strap is supported by shoulder straps 32, there being loops 32ª on the shoulder straps. The shoulder straps have adjusting buckles as indicated at 33 and have extensions 34 below the body strap 31, said extensions being adapted for detachable connection with the belt 10 by means of tabs 35 on the latter provided with buttons 36 to be engaged by buttonholes 37 of said extensions. The body strap at the back has a buckle 31ª to detachably engage the opposite end 31ᵇ.

Having thus described my invention I claim as new, and desire to secure by Letters Patent:

1. A fishing device including a body belt, a socket thereon adapted to receive the butt of a fishing pole, a second socket on the belt, and a bracket arm supported in said socket and formed with a pole rest at its front end.

2. A fishing device including a body belt, a socket thereon adapted to receive the butt of a fishing pole, a second socket on the belt, and a bracket arm supported in said socket and formed with a pole rest at its front end; together with a body strap above the belt and a flexible brace connecting said strap with the said bracket.

3. A fishing device including a body belt, a socket swiveled thereon adapted to receive the butt of a fishing pole, means to secure the socket in different angular positions, means to clamp the pole in the socket, a second socket, an elongated bracket arm turnable in said socket and extending forwardly therefrom, and a supporting fork on the front end of the bracket.

KENTON DRINKARD.

Witnesses:
F. F. SUTTON,
A. S. BOMBERGER.